United States Patent
Litton et al.

(10) Patent No.: US 12,428,348 B2
(45) Date of Patent: Sep. 30, 2025

(54) ENVIRONMENTAL BARRIER COATING WITH THERMAL PROPERTIES

(71) Applicant: RAYTHEON TECHNOLOGIES CORPORATION, Farmington, CT (US)

(72) Inventors: David A. Litton, West Hartford, CT (US); Richard Wesley Jackson, III, Mystic, CT (US); Xia Tang, West Hartford, CT (US); James T. Beals, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/849,180

(22) Filed: Jun. 24, 2022

(65) Prior Publication Data

US 2023/0416157 A1    Dec. 28, 2023

(51) Int. Cl.

| | |
|---|---|
| *C04B 41/52* | (2006.01) |
| *C04B 35/565* | (2006.01) |
| *C04B 41/00* | (2006.01) |
| *C04B 41/50* | (2006.01) |
| *C04B 41/87* | (2006.01) |
| *C04B 41/89* | (2006.01) |

(52) U.S. Cl.
CPC .......... *C04B 35/565* (2013.01); *C04B 41/009* (2013.01); *C04B 41/5035* (2013.01); *C04B 41/5059* (2013.01); *C04B 41/524* (2013.01); *C04B 41/87* (2013.01); *C04B 41/89* (2013.01); *C04B 2235/5436* (2013.01)

(58) Field of Classification Search
None
See application file for complete search history.

(56) References Cited

U.S. PATENT DOCUMENTS

| 10,392,312 B2 | 8/2019 | Tang et al. | |
|---|---|---|---|
| 2004/0234783 A1* | 11/2004 | Eaton .................. | C04B 41/5027 428/446 |
| 2013/0344319 A1* | 12/2013 | Zhu ....................... | C04B 41/009 428/335 |
| 2017/0218779 A1 | 8/2017 | Luthra et al. | |

(Continued)

FOREIGN PATENT DOCUMENTS

| EP | 3838871 | 6/2021 |
|---|---|---|
| EP | 3862337 | 8/2021 |

(Continued)

OTHER PUBLICATIONS

European Search Report for European Patent Application No. 23179562.6 dated Nov. 17, 2023.

(Continued)

*Primary Examiner* — Kim S. Horger

(74) *Attorney, Agent, or Firm* — Carlson, Gaskey & Olds, P.C.

(57) ABSTRACT

An article according to an exemplary embodiment of this disclosure, among other possible things includes a substrate and a barrier layer on the substrate. The barrier layer includes a bond coat comprising a matrix, diffusive particles disposed in the matrix, and gettering particles disposed in the matrix. At least about 10% of the gettering particles are in a crystalline phase. The article also includes a top coat. An article is also disclosed.

20 Claims, 3 Drawing Sheets

(56) References Cited

U.S. PATENT DOCUMENTS

| | | |
|---|---|---|
| 2021/0188720 A1 | 6/2021 | Ding et al. |
| 2021/0189904 A1* | 6/2021 | Kracum ................. F01D 5/288 |
| 2021/0246080 A1 | 8/2021 | Jackson et al. |
| 2021/0246082 A1* | 8/2021 | Jackson ................. C04B 41/85 |

FOREIGN PATENT DOCUMENTS

| | | |
|---|---|---|
| EP | 3862338 | 8/2021 |
| EP | 3904313 | 11/2021 |
| EP | 3904314 | 11/2021 |
| EP | 3960719 | 3/2022 |
| WO | 2015147960 | 10/2015 |

OTHER PUBLICATIONS

International Search Report and Written Opinion for International Patent Application No. PCT/US2023/026127 dated Oct. 6, 2023.
International Preliminary Report on Patentability for International Application No. PCT/US2023/026127 dated Jan. 2, 2025.

* cited by examiner

ENVIRONMENTAL BARRIER COATING WITH THERMAL PROPERTIES

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a substrate and a barrier layer on the substrate. The barrier layer includes a bond coat comprising a matrix, diffusive particles disposed in the matrix, and gettering particles disposed in the matrix. At least about 10% of the gettering particles are in a crystalline phase. The article also includes a top coat.

In a further example of the foregoing, the bond coat comprises a first bond coat layer adjacent the substrate and a second bond coat layer adjacent the top coat.

In a further example of any of the foregoing, the gettering particles in one of the first and second bond coat layers are substantially all amorphous gettering particles and the gettering particles in the other of the first and second bond coat layers are substantially all crystalline gettering particles.

In a further example of any of the foregoing, at least one of the first and second layers includes a mixture of amorphous and crystalline gettering particles.

In a further example of any of the foregoing, each of the first and second layers include between about 5 and about 40 percent by volume matrix.

In a further example of any of the foregoing, the first layer includes the balance crystalline silicon carbide or silicon dioxide gettering particles.

In a further example of any of the foregoing, the second layer includes between about 55 and 94 percent by volume crystalline silicon carbide or silicon dioxide gettering particles.

In a further example of any of the foregoing, the second layer includes between about 55 and 94 percent by volume amorphous silicon carbide or silicon dioxide gettering particles.

In a further example of any of the foregoing, the second layer includes gettering particles having an average maximum dimension between about 1 and about 75 microns.

In a further example of any of the foregoing, the gettering particles in the second layer have a larger average diameter than the gettering particles in the first layer.

In a further example of any of the foregoing, the bond coat further comprises a third bond coat layer. The first, second, and third layers are in an alternating pattern of layers with substantially all crystalline gettering particles and layers with substantially all amorphous gettering particles.

In a further example of any of the foregoing, the gettering particles include a mixture of amorphous and crystalline gettering particles.

In a further example of any of the foregoing, the gettering particles are substantially all in the crystalline phase.

In a further example of any of the foregoing, the gettering particles are silicon carbide.

In a further example of any of the foregoing, the gettering particles are silicon oxycarbide.

An article according to an exemplary embodiment of this disclosure, among other possible things includes a ceramic matrix composite substrate and a barrier layer on the substrate. The barrier layer includes a bond coat comprising a silicon dioxide matrix, diffusive particles disposed in the matrix, and silicon carbide or silicon oxycarbide gettering particles disposed in the matrix. At least about 10% of the gettering particles are in a crystalline phase. The article also includes a topcoat.

In a further example of the foregoing, the bond coat comprises a first bond coat layer adjacent the substrate and a second bond coat layer adjacent the top coat.

In a further example of any of the foregoing, the gettering particles in one of the first and second bond coat layers are substantially all amorphous gettering particles and the gettering particles in the other of the first and second bond coat layers are substantially all crystalline gettering particles.

In a further example of any of the foregoing, at least one of the first and second layers includes a mixture of amorphous and crystalline gettering particles.

In a further example of any of the foregoing, the second layer includes gettering particles having an average maximum dimension between about 1 and about 75 microns. The gettering particles in the second layer have a larger average diameter than the gettering particles in the first layer.

DETAILED DESCRIPTION

Figure 1:
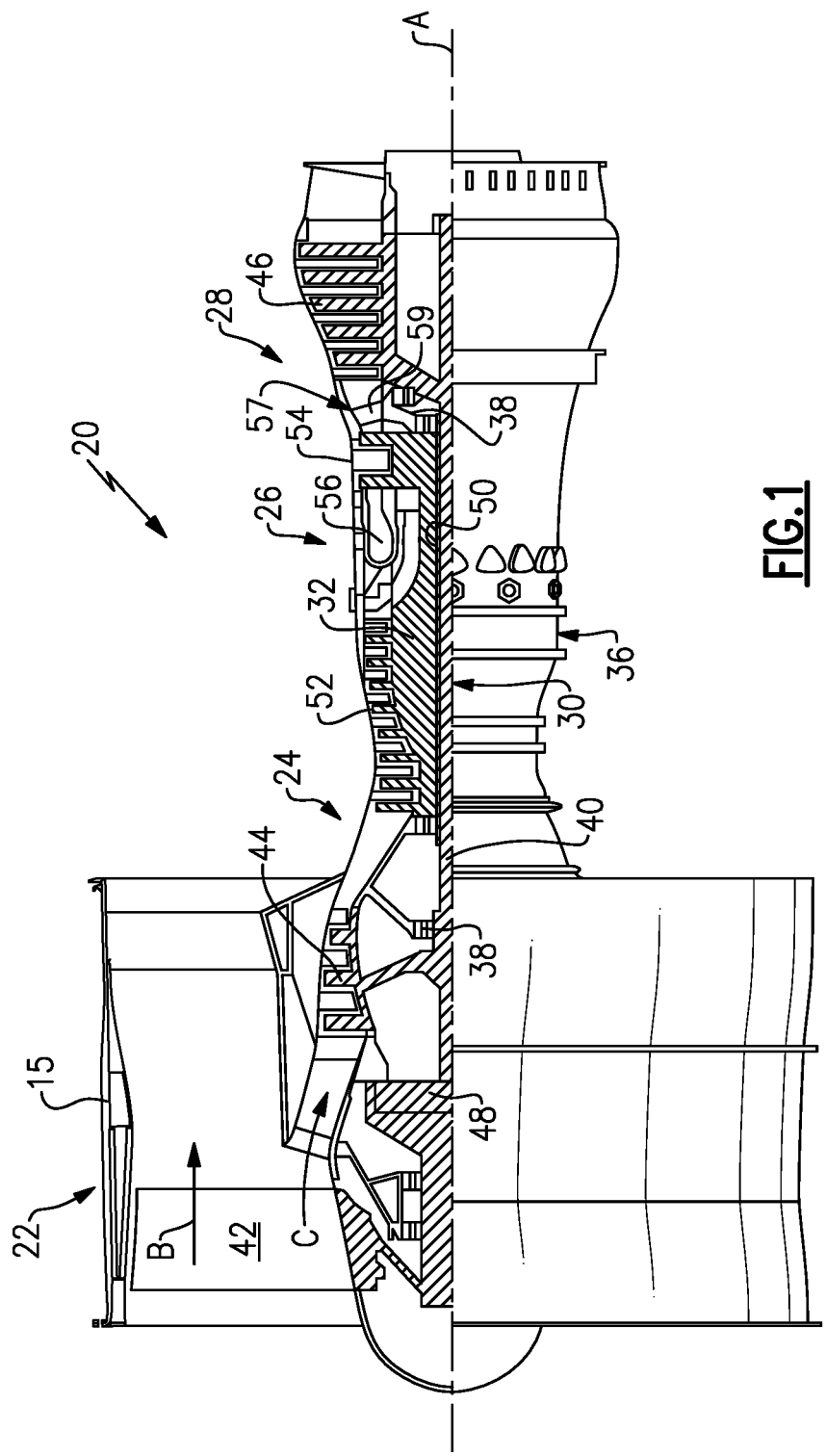
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
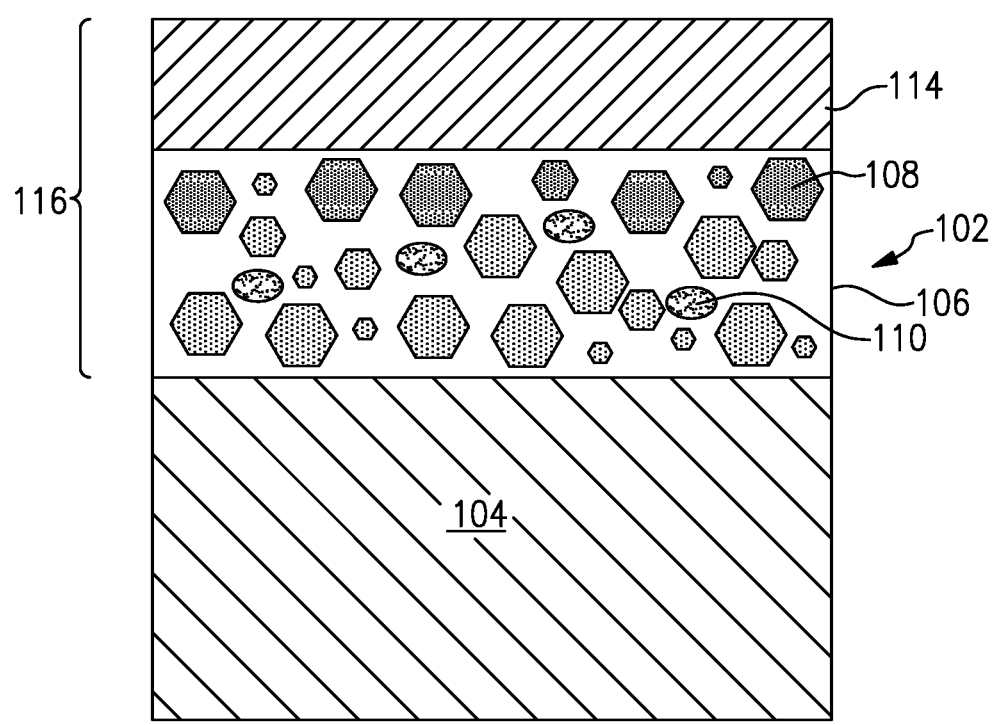
FIG. 2 illustrates an article for the gas turbine engine with a coating.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, boron silicate particles, boron aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

The bond coat 102 can be applied by any known method, such as a slurry coating method.

A ceramic-based top coat 114 is interfaced directly with the bond coat 102. As an example, the ceramic-based top coat 114 can include one or more layers of an oxide-based material. The oxide-based material can be, for instance, hafnium-based oxides or yttrium-based oxides (such as hafnia, hafnium silicate, yttrium silicates, yttria stabilized zirconia or gadolinia stabilized zirconia), calcium aluminosilicates, mullite, barium strontium aluminosilicate, or combinations thereof, but is not limited to such oxides. The topcoat 114 can be applied by any known method such as thermal spray (like air plasma spray) methods or slurry application methods.

The top coat 114 and bond coat 102 together form a barrier coating 116 for the substrate 104. The top coat 114 is the outermost layer of the barrier coating 116, and is exposed to the elements when the article 100 is in use.

As discussed above, the barrier coating 116 and in particular the bond coat 102 provides environmental resistance to the article 100. However, it may also be advantageous to provide a barrier layer 116 with tailored thermal properties. For instance, where the article 100 is cooled primarily by internal cooling, e.g., the article 100 receives a flow of cooling air, a large temperature gradient may be formed through the thickness of the article 100 when it is in use, since the exterior of the article 100 is exposed to very hot conditions while the interior of the article receives cooling airflow. The article 100 may benefit from thermal protection provided by the barrier coating 116 to reduce the temperature gradient, meaning a barrier coating 116 with low thermal conductivity may be used. On the other hand, where the article 100 is not subject to any significant cooling, a barrier coating 116 with high thermal conductivity may be preferred to as not to introduce a temperature gradient to the article 100. In other examples, a barrier coating 116 with intermediate thermal conductivity may be desired. For instance, a barrier coating 116 with intermediate thermal conductivity may be preferable where it would be beneficial to minimize the temperature gradient experienced by an article 100 while maintaining the temperature of the article 100 below a maximum allowable operating temperature.

In particular, the bond coat 102 is comprised primarily of gettering particles 108. In a particular example, the bond coat 102 includes between about 60 and about 95 percent by volume gettering particles 102, between about 5 and about 40 percent by volume matrix 106, and the balance diffusive particles 110. Accordingly, selecting gettering particles 108 with desired thermal properties provides a barrier coating 116 with the desired thermal properties. Therefore, the bond coat 102 described herein includes 0-100% crystalline gettering particles 108 and 0-100% amorphous gettering particles 108, wherein the amounts are selected according to the desired thermal properties of the barrier coating 116. That is, the bond coat 102 may comprise substantially all crystalline gettering particles 108, substantially all amorphous gettering particles 108, or a mixture of the two. In a particular example, the bond coat 102 includes greater than about 10% crystalline gettering particles 108.

As discussed above, two example gettering particles 108 are silicon carbide and silicon oxycarbide particles. Amorphous silicon carbide and silicon oxycarbide have lower thermal conductivity than crystalline silicon carbide and silicon oxycarbide, respectively. Other gettering particles 108 with similar chemistry as silicon carbide/silicon oxycarbide behave similarly. Accordingly, a bond coat 102 including primarily amorphous gettering particles 108 will have lower thermal conductivity as compared to a bond coat 102 including primarily crystalline gettering particles. Bond coats 102 having mixtures of amorphous and crystalline gettering particles 108 will have intermediate thermal conductivity. In this way, the thermal conductivity of the bond coat 102 can be selected by varying the relative amounts of amorphous and crystalline gettering particles 108. The amorphous particles can be produced by any known method, such as pyrolysis of any suitable polymer. Likewise crystalline particles can be produced by any known method, such as the Acheson process followed by classification to isolate particles in the desired size range.

Figure 3:
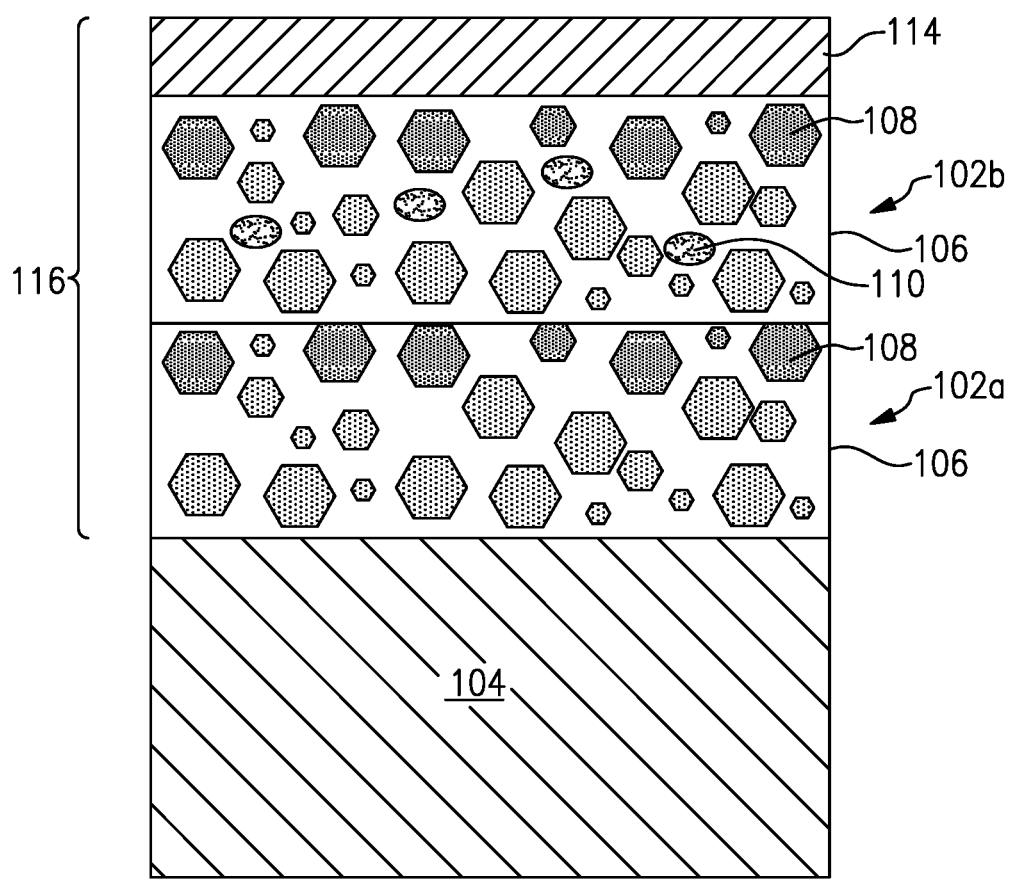
FIG. 3 schematically illustrates another article for the gas turbine engine with another coating.

In one particular example barrier layer 116 with low thermal conductivity shown in FIG. 3, the bond coat 102 comprises two layers 102a/102b. The first layer 102a is disposed on the substrate 104 and the second layer 102b is disposed on the first layer 102a. The topcoat 114 is disposed on the second layer 102b. In this example, both layers 102a/102b include between about 5 and about 40 percent by volume matrix 106 such as silicon dioxide and amorphous silicon carbide gettering particles 108. The first layer 102a includes the balance amorphous silicon carbide gettering particles 108 which have an average diameter between about 1 and 75 microns (0.04 and 2.9 mils). The second layer 102b includes between about 55 and about 94 percent by volume amorphous silicon carbide gettering particles 108 which have an average diameter that is between about 1 and 75 microns (0.04 and 2.9 mils), and the balance diffusive particles 110.

In a particular example, the gettering particles 108 in the second layer 102b have an average diameter higher than the average diameter of the gettering particles 108 in the first layer 102a. In general, smaller particles conform better to the adjoining surface, increasing adhesion of the particles to the surface. Smaller particles also exhibit improved packing and therefore provide a coating layer with lower porosity. Additionally, smaller particles have higher surface area-to-volume ratio, meaning there is a higher likelihood that oxidant particles in the barrier coating 116 will react with the gettering particle 108 than the substrate 104, providing an additional layer of protection near the substrate 104. On the other hand, larger gettering particles 108 have a longer lifetime in the barrier coating 116 because they have more matter that is available to react with oxidants and provide environmental protection as discussed above. Therefore, providing smaller gettering particles 108 in the first layer 102a improves adhesion of the first layer 102a to the substrate 104 and provides a relatively low porosity layer 102a, while providing larger gettering particles 108 in the second layer 102b improves the environmental protection and lifetime of the layer 102b, which is exterior to the first layer 102a and therefore more likely to encounter oxidant particles.

Another particular example barrier layer 116 with low thermal conductivity is identical to the particular example discussed above except that amorphous silicon oxycarbide is substituted for amorphous silicon carbide.

In one particular example barrier layer 116 with high thermal conductivity the bond coat 102 comprises two layers 102a/102b as in the example of FIG. 3. In this example, both layers 102a/102b include between about 5 and about 40 percent by volume matrix 106 such as silicon dioxide and crystalline silicon carbide gettering particles 108. The first layer 102a includes the balance crystalline silicon carbide gettering particles 108 which have an average diameter between about 1 and 75 microns (0.04 and 2.9 mils). The second layer 102b includes between about 55 and about 94 percent by volume crystalline silicon carbide gettering particles 108 which have an average diameter that is between about 1 and 75 microns (0.04 and 2.9 mils), and the balance diffusive particles 110. In a particular example, the gettering particles 108 in the second layer 102b have an average diameter higher than the average diameter of the gettering particles 108 in the first layer 102a.

Another particular example barrier layer 116 with high thermal conductivity is identical to the particular example discussed above except that crystalline silicon oxycarbide is substituted for crystalline silicon carbide.

In one particular example barrier layer 116 with intermediate thermal conductivity, the bond coat 102 comprises two layers 102a/102b as in the example of FIG. 3. In this example, both layers 102a/102b include between about 5 and about 40 percent by volume matrix 106 such as silicon dioxide. The first layer 102a includes the balance of crystalline silicon carbide gettering particles 108 which have an average diameter between about 1 and 75 microns (0.04 and 2.9 mils). The second layer 102b includes between about 55 and about 94 percent by volume amorphous silicon carbide gettering particles 108 which have an average diameter that is between about 1 and 75 microns (0.04 and 2.9 mils), and the balance diffusive particles 110. In a particular example, the gettering particles 108 in the second layer 102b have an average diameter higher than the average diameter of the gettering particles 108 in the first layer 102a. The combination of the amorphous and crystalline gettering particles 108 provides an intermediate thermal conductivity as compared to the examples described above which include primarily (or only) amorphous or primarily (or only) crystalline gettering particles.

Another particular example barrier layer 116 with intermediate thermal conductivity is identical to the particular example discussed above except that crystalline silicon oxycarbide is substituted for crystalline silicon carbide. Amorphous silicon oxycarbide may be substituted for amorphous silicon carbide as well.

Another particular example barrier layer 116 with intermediate thermal conductivity includes a multilayer bond coat 102 having more than two layers 102a/102b. In particular, the example barrier layer 116 can have between 3 and 8 bond coat layers 102a/102b. Each of the layers 102a/102b can have either crystalline or amorphous gettering particles, or combinations of the two. In a particular example, the layers 102a/102b each have either amorphous or crystalline gettering particles 108 and are arranged so that crystalline gettering particles 108 and amorphous gettering particles 108 are in alternating layers 102a/102b. In another example, one or more of the layers 102a/102b have mixtures of crystalline and amorphous gettering particles.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article, comprising:
a substrate; and
a barrier layer on the substrate, the barrier layer including
a bond coat comprising a matrix, diffusive particles disposed in the matrix, and gettering particles disposed in the matrix, wherein at least about 10% of the gettering particles are in a crystalline phase, and
a topcoat,
wherein the bond coat includes a first bond coat layer, a second bond coat layer, and a third bond coat layer, and wherein the first bond coat layer, the second bond coat layer, and the third layer are arranged in an alternating pattern of crystalline gettering particle layers and amorphous gettering particle layers in which substantially all of the gettering particles in each of the first bond coat layer and the third bond coat layer are crystalline or amorphous, and substantially all of the gettering particles in the second bond coat layer are the other of crystalline or amorphous.

2. The article of claim 1, wherein the first bond coat layer is adjacent the substrate.

3. The article of claim 2, wherein each of the first and second layers include between about 5 and about 40 percent by volume matrix.

4. The article of claim 3, wherein the first layer includes the balance crystalline silicon carbide or silicon dioxide gettering particles.

5. The article of claim 3, wherein the second layer includes between about 55 and 94 percent by volume crystalline silicon carbide or silicon dioxide gettering particles.

6. The article of claim 3, wherein the second layer includes between about 55 and 94 percent by volume amorphous silicon carbide or silicon dioxide gettering particles.

7. The article of claim 2, wherein the second layer includes gettering particles having an average maximum dimension between about 1 and about 75 microns.

8. The article of claim 7, wherein the gettering particles in the second layer have a larger average diameter than the gettering particles in the first layer.

9. The article of claim 1, wherein the gettering particles are silicon carbide.

10. The article of claim 1, wherein the gettering particles are silicon oxycarbide.

11. The article of claim 1, wherein the first bond coat layer is adjacent the substrate.

12. The article of claim 11, wherein the second layer includes gettering particles having an average maximum dimension between about 1 and about 75 microns, and wherein the gettering particles in the second layer have a larger average diameter than the gettering particles in the first layer.

13. The article of claim 1, wherein substantially all of the gettering particles in each of the first bond coat layer and the third bond coat layer are crystalline, and substantially all of the gettering particles in the second bond coat layer are amorphous.

14. The article of claim 1, wherein 100% of the gettering particles in each of the first bond coat layer and the third bond coat layer are amorphous, and 100% of the gettering particles in the second bond coat layer are crystalline.

15. The article of claim 11, wherein each of the first and second layers include between about 5 and about 40 percent by volume matrix, and the first layer includes the balance crystalline silicon carbide or silicon dioxide gettering particles.

16. The article of claim 15, wherein the second layer includes between about 55 and 94 percent by volume crystalline silicon carbide or silicon dioxide gettering particles.

17. The article of claim 15, wherein the second layer includes between about 55 and 94 percent by volume amorphous silicon carbide or silicon dioxide gettering particles.

18. An article, comprising:
a ceramic matrix composite substrate; and
a barrier layer on the substrate, the barrier layer including
a bond coat comprising a silicon dioxide matrix, diffusive particles disposed in the matrix, and silicon carbide or silicon oxycarbide gettering particles disposed in the matrix, wherein at least about 10% of the gettering particles are in a crystalline phase, and
a topcoat,
wherein the bond coat includes a first bond coat layer, a second bond coat layer, and a third bond coat layer, and wherein the first bond coat layer, the second bond coat layer, and the third layer are arranged in an alternating pattern of crystalline gettering particle layers and amorphous gettering particle layers in which substantially all of the gettering particles in each of the first bond coat layer and the third bond coat layer are crystalline or amorphous, and substantially all of the gettering particles in the second bond coat layer are the other of crystalline or amorphous.

19. The article of claim 18, wherein 100% of the gettering particles in each of the first bond coat layer and the third bond coat layer are crystalline, and 100% of the gettering particles in the second bond coat layer are amorphous.

20. The article of claim 18, wherein 100% of the gettering particles in each of the first bond coat layer and the third bond coat layer are amorphous, and 100% of the gettering particles in the second bond coat layer are crystalline.

\* \* \* \* \*